May 14, 1929. S. A. LOWANCE 1,713,235
PORTABLE AUTOMATICALLY OPERATED OPENING AND CLOSING GATE
Original Filed Oct. 11, 1926
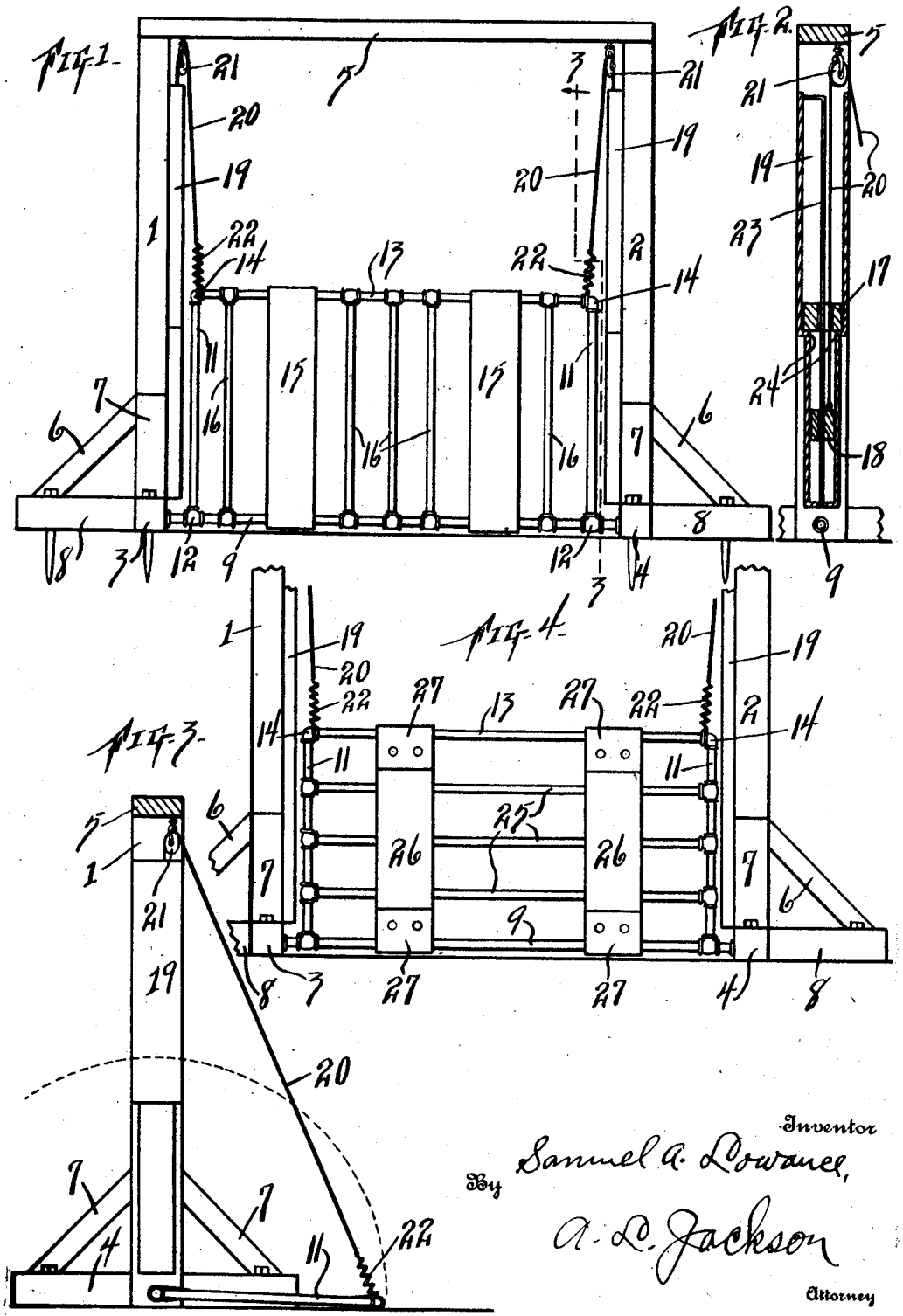

Patented May 14, 1929.

1,713,235

UNITED STATES PATENT OFFICE.

SAMUEL A. LOWANCE, OF RHOME, TEXAS, ASSIGNOR OF ONE-FOURTH TO C. T. LOWANCE, ONE-FOURTH TO T. G. ROGERS, AND ONE-FOURTH TO J. M. SCOTT, ALL OF DECATUR, TEXAS.

PORTABLE AUTOMATICALLY-OPERATED OPENING AND CLOSING GATE.

Application filed October 11, 1926, Serial No. 140,752. Renewed March 9, 1929.

My invention relates to gates and more particularly to gates which can be opened by passing vehicles and which will be automatically closed after the passing of the vehicles; and the object is to provide a gate which will be opened by a passing vehicle and which will be pressed down to the ground by the vehicle so that the vehicle will pass through without stopping and which will be restored to the closed position after the vehicle passes. Another object is to provide a gate which is portable so that it can be moved from place to place without having to reconstruct the gate or the means for mounting or installing the gate. Other objects and advantages will be fully explained in the following description and the invention will be more particularly pointed out in the claim.

Reference is had to the accompanying drawings which form a part of this application.

Fig. 1 is an elevation of a gate which is provided with the improvements.

Fig. 2 is a detail view of the guide and operating means.

Fig. 3 is an interior elevation, taken substantially on the line 3—3 of Fig. 1.

Fig. 4 is an elevation of a gate which contains a variation in the structure.

Similar characters of reference are used to indicate the same parts throughout the several views.

A frame for a gate way is provided for mounting or installing a gate. This frame has uprights 1 and 2 which are attached to base members 3 and 4. A cross bar 5 is attached to the upper ends to brace the uprights 1 and 2. Angular braces 6 are also used to brace the uprights 1 and 2. Braces 7 are attached to the uprights and to the bars 3 and 4. Braces 6 are attached to the uprights 1 and 2 and to horizontal base members 8. The uprights 1 and 2 may be gained into the members 3 and 4. The gate is provided with a hinge rod or bar 9 which is journaled in the uprights 1 and 2 near the bottoms thereof. The gate is further composed of upright members 11, preferably of pipe, which are connected to the hinge member 9 by T-joints 12. The top member 13 is connected to the members 11 by elbow joints 14. Track members 15 are attached to the members 9 and 13 for the vehicle wheels. The track members 15 may be of sheet metal. Other brace members 16 are attached to the members 9 and 13.

The gate is held normally in the upright closed position by weights 17 and 18 and these weights will automatically close the gate after a vehicle has passed and opened the gate. Housings 19 are provided for the weights 17 and 18 and these housings serve as guide ways for the weights in their vertical motion. The weights 18 are connected to cords or cables 20 which are run upwardly in the housings 19 and over idle pulleys 21 and then down and attached to the top members 13. Springs 22 may be used to form parts of the cables so that there will not be too sudden jerking or hammering on the gate when a vehicle comes against the gate. The springs 22 serve as shock absorbers. The weights 17 are so positioned that the pull on the gate will not be impeded by the entire weight of all the weights. Guide rods 23 are provided for the weights 17 and 18 and the weights have openings therethrough for the guide rods 23. Each housing has a stop shoulder 24 made therein. The weights 17 normally rest on the stop shoulders 24, but when the vehicle pushes the gate until the weights 18 are drawn upwardly, they will in time come up under the weights 17 and so lift the weights 17. The effect of such action will tend to keep the gate from going downwardly too fast and the combined weights will help to start the gate to closed position more readily after the vehicle has passed off of the gate. The weights 17 and 18 will close the gate immediately after the vehicle passes off of the gate.

In the form of gate shown in Fig. 4, the brace members 25 may run horizontally instead of vertically. The track members 26 may be of wood and attached to the upper member 13 and to the lower member 9 by iron or steel clips 27.

What I claim, is:—

A device of the character described, a frame composed of upright members and a cross bar attached to said upright members, means for bracing the lower ends of said uprights, a gate hingedly connected at its lower side to the lower ends of said uprights, housings attached to said uprights, guide rods in said housings, weights having openings therethrough to receive said guide rods, pulleys suspended from said cross-bar, and cords attached to said gate and run over said pulleys and down into said housings and attached to said weights.

In testimony whereof, I set my hand, August, 1926.

SAMUEL A. LOWANCE.